(12) United States Patent
Kamdar et al.

(10) Patent No.: US 8,619,593 B2
(45) Date of Patent: Dec. 31, 2013

(54) MANAGEMENT OF FIXED WIRELESS DEVICES THROUGH AN IP NETWORK

(75) Inventors: Kamlesh S. Kamdar, Dublin, CA (US); Sergio Aguirre, Southlake, TX (US); Raafat Edward Kamel, Little Falls, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 200 days.

(21) Appl. No.: 13/156,800

(22) Filed: Jun. 9, 2011

(65) Prior Publication Data

US 2012/0314585 A1 Dec. 13, 2012

(51) Int. Cl.
*H04W 24/00* (2009.01)
*H04W 4/00* (2009.01)

(52) U.S. Cl.
USPC .......................................... 370/242; 370/241

(58) Field of Classification Search
USPC ........................... 370/254–340; 709/201–213
See application file for complete search history.

(56) References Cited

U.S. PATENT DOCUMENTS

| | | | |
|---|---|---|---|
| 7,529,544 B1 * | 5/2009 | Oh et al. | 455/426.2 |
| 2005/0179607 A1 | 8/2005 | Gorsuch et al. | |
| 2007/0173303 A1 | 7/2007 | Viorel et al. | |
| 2010/0311321 A1 | 12/2010 | Norin | |
| 2010/0313232 A1 | 12/2010 | Norin | |
| 2012/0023226 A1 * | 1/2012 | Petersen et al. | 709/224 |
| 2012/0071168 A1 * | 3/2012 | Tomici et al. | 455/445 |
| 2012/0250658 A1 * | 10/2012 | Eisl et al. | 370/331 |

* cited by examiner

*Primary Examiner* — Ayaz Sheikh
*Assistant Examiner* — Debebe Asefa

(57) ABSTRACT

A device may manage fixed wireless installations. The device may receive data relating to the fixed wireless installations, where the data is received from a number of sources, including the fixed wireless installations and network devices used to implement a long term evolution (LTE) cellular network to which the fixed wireless installations connect. The device may analyze the data to determine optimizations to improve the operation of one or more of the fixed wireless installations or the LTE cellular network. The device may change, in response to the analysis, a configuration of at least one of the fixed wireless installations and at least one of the network devices.

17 Claims, 8 Drawing Sheets

MANAGEMENT OF FIXED WIRELESS DEVICES THROUGH AN IP NETWORK

BACKGROUND

Bundled media services (e.g., combination packages of television, telephone, and broadband Internet services) have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons that these fixed wireless services remained unpopular.

As wireless network data rates improve using fourth generation (4G) technologies, such as long term evolution (LTE), network data rates have become more attractive for wireless networks that include fixed wireless devices. Fixed wireless installations, however, may place different demands on the wireless network than traditional mobile wireless devices. It may thus be important to be able to effectively manage and set policies for the fixed wireless installations.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for effective management and control of fixed wireless installations. The fixed wireless installations may include services such as broadband and telephone provided through a cellular wireless network. A device manager, which may connect to the fixed wireless installations through an Internet Protocol (IP) network, may receive status information from and update configurations of the fixed wireless installations. A network operations center may receive the status information from the device manager as well as other information, received from devices in the wireless network, relating to the operation of the fixed wireless installations. The network operations center may automatically, or in response to actions from an administrator, optimize operation of the wireless network and/or the fixed wireless installations.

Figure 1:
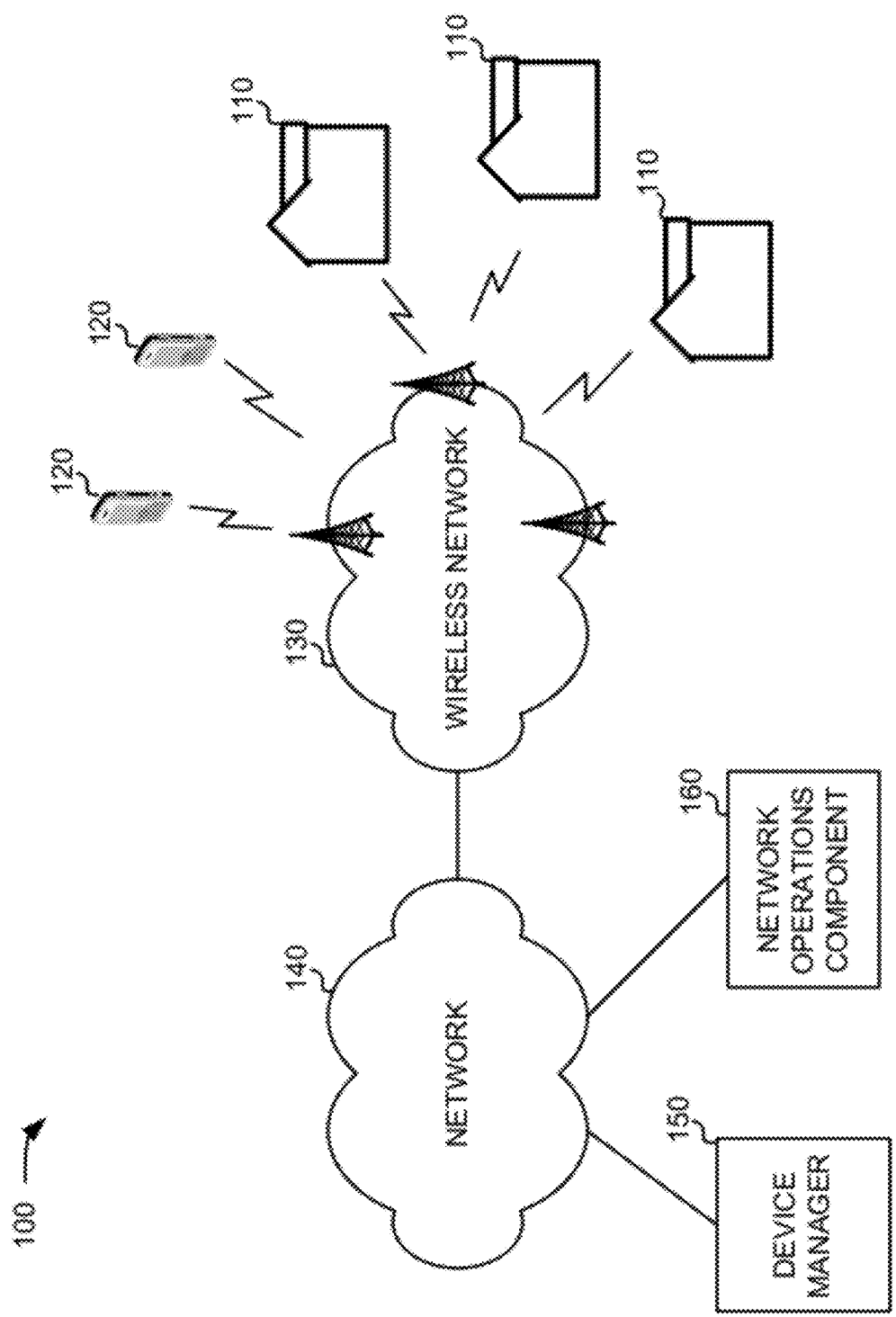
FIG. 1 is a diagram of an example environment in which systems and/or methods described herein may be implemented.

FIG. 1 is a diagram of an example environment 100 in which systems and/or methods described herein may be implemented. As illustrated, environment 100 may include customer premise networks 110, mobile devices 120, a wireless network 130, a network 140, a device manager 150, and a network operations component 160.

Customer premise networks 110 may include one or more devices connected to each other and to wireless network 130. In some implementations, customer premise networks 110 may also include connections to other networks, such as a connection, via a satellite dish, to a satellite network. Customer premise networks 110 may be associated with a fixed location, such as the home of a customer, and may thus be fixed wireless installations. Devices in a customer premise network 110 may include, for example, set-top boxes (STBs), televisions, computers, and home networking equipment (e.g., routers, cables, splitters, local gateways, etc.). Devices within each customer premise network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards).

In general, each customer premise network 110 may connect, through a radio link, to wireless network 130. Through the connection, the customer premise network 110 may obtain data services, such as telephone and broadband services. The data services may be shared among devices in each customer premise network 110, such as a broadband delivered to multiple computers, gaming systems, security monitor systems, telephone lines, etc., in customer premise network 110.

Mobile devices 120 may include portable computing and communication devices, such as a personal digital assistant (PDA), a smart phone, a cellular phone, a laptop with an integrated connectivity to a cellular wireless network, etc. Mobile devices 120 may connect, through a radio link, to wireless network 130.

Wireless network 130 may include a network that provides connectivity to customer premise networks 110 and mobile devices 120. Wireless network 130 may represent, for example, a cellular network operated by a cellular provider. In one implementation, wireless network 130 may include a long term evolution (LTE) network that provides wireless services. Although called a "wireless" network, the wireless portion of wireless network 130 may refer to the radio interfaces provided by wireless network 130 to customer premise networks 110 and mobile devices 120. Connectivity between devices in wireless network 130 may be provided as wired and/or wireless connections.

Network 140 may include a local area network (LAN), a wide area network (WAN), a metropolitan area network (MAN), an intranet, the Internet, an optical fiber (or fiber optic)-based network, or a combination of networks. In one implementation, network 140 may be a packet-based network, such as an IP network.

Device manager 150 may include one or more server devices, or other types of computation or communication devices, that communicate with customer premise networks 110 to receive information relating to the operation of customer premise networks 110 and/or to configure one or more devices in customer premise networks 110. Thus, device manager 150 may act to manage one or more of the devices within customer premise network 110. As part of managing the devices within customer premise network 110, device manager 150 may receive information relating to the operational state of devices within customer premise network 110. For example, device manager 150 may store configuration information relating to the communication settings for the radio interface to wireless network 130, information relating to the stability of customer premise network 110, or other information that may be useful in managing or optimizing the operation of customer premise network 110. In one implementation, device manager 150 may communicate with devices in customer premise networks 110 using the TR-069 remote device management standard.

Network operations component 160 may include one or more server devices, or other types of computation or communication devices, that enable the automatic or manual administration of wireless network 130 and customer premise networks 110. Through network operations component 160, administrators may view information relating to the status of customer premise networks 110 and devices in wireless network 130 that relate to customer premise networks 110, perform data management and analysis functions relating to customer premise networks 110, control network policy enforcement in wireless network 130, and/or perform optimizations for applications being used by devices in customer premise networks 110. The operation of network operations component 160 will be described in more detail below.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
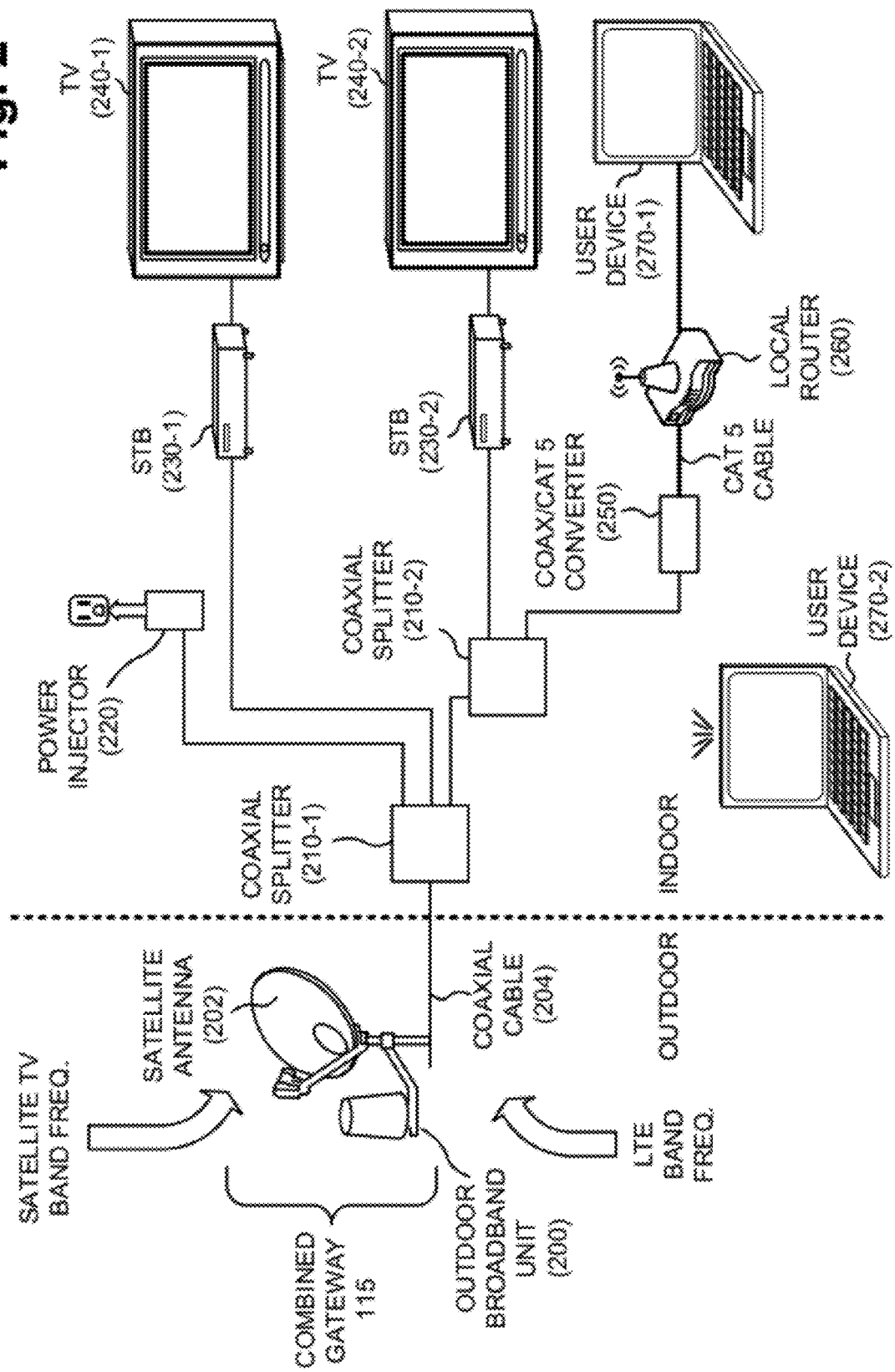
FIG. 2 is a diagram of an example customer premise network.

FIG. 2 is a diagram of an example customer premise network 110 according to an implementation described herein. Customer premise network 110 may include a combined gateway 115, which may be installed externally to customer premises network 110, and may include an outdoor broadband unit 200 and a satellite antenna 202. A coaxial cable 204 may connect combined gateway 115 to the indoor portion of customer premise network 110. Customer premise network 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with a base station) and IP protocols (e.g., associated with user devices 270). Outdoor broadband unit 200 may be physically deployed with satellite antenna 202 (e.g., on a roof or a side wall of a house associated with customer premises network 110) as part of combined gateway 115. For example, outdoor broadband unit 200 may utilize a pre-existing or a new satellite TV installation in a way that both broadband (over LTE) service and satellite TV are brought indoors (e.g., inside the customer premises) over a coaxial cable 204.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter. For example, coaxial splitters 210 may facilitate allocating logical channels using different frequency blocks for viewer-selected television programming and broadband signals to the SWiM-compatible STBs 230 and/or local router 260.

Power injector 220 may include a conventional mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 converter 250 may include a conventional device to convert incoming signals from coaxial cables to outgoing signals on Cat 5 cables.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a USB Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a tablet computer, a gaming system, etc.

Although FIG. 2 shows example components of a customer premise network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
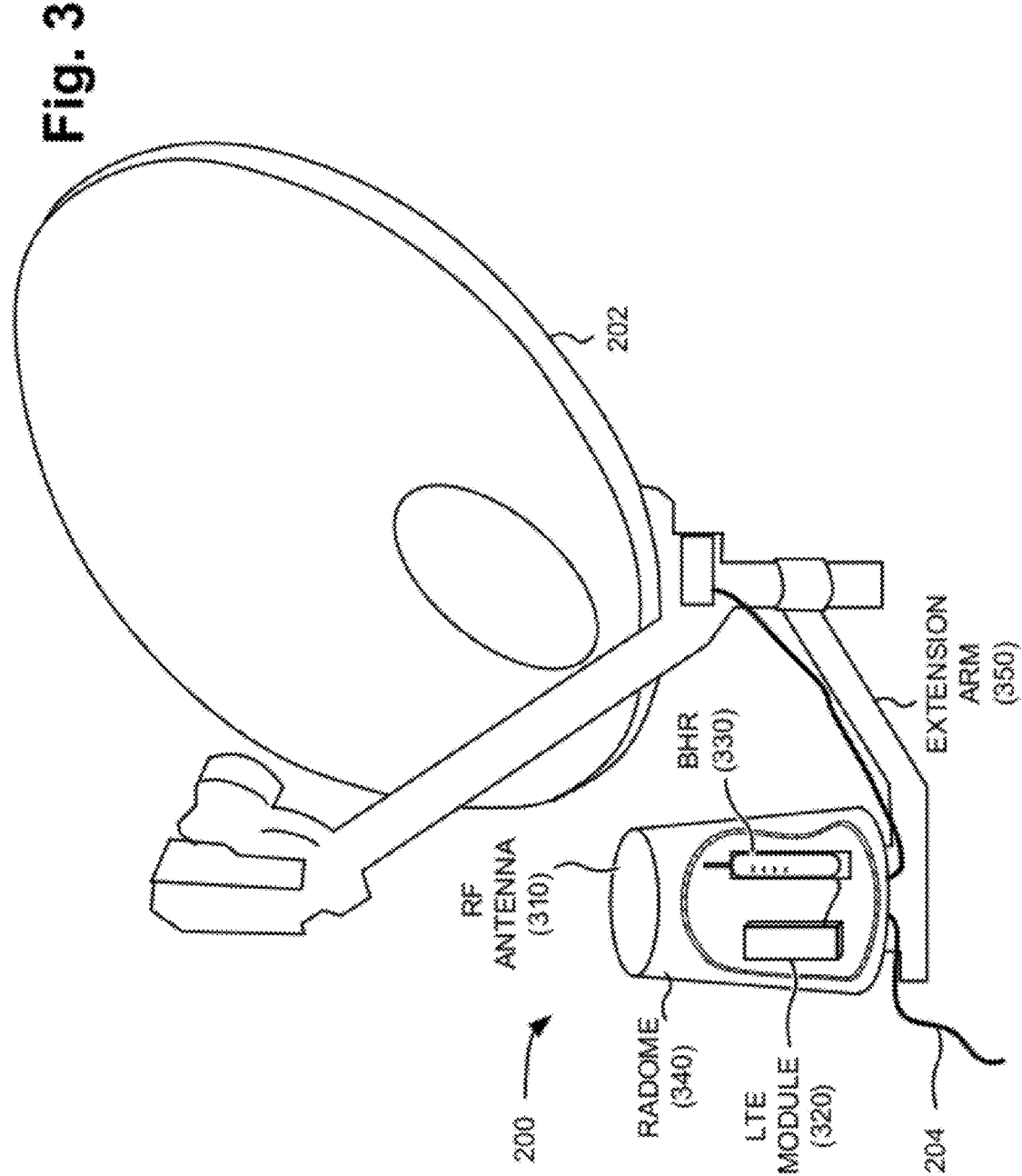
FIG. 3 is a diagram of example components of a combined gateway of a customer premise network.

FIG. 3 is a diagram of example components of combined gateway 115 of customer premises network 110. As illustrated, combined gateway 115 may include outdoor broadband unit 200 and satellite antenna 202. Outdoor broadband unit 200 may include a radio frequency (RF) antenna 310, a LTE module 320, and a broadband home router (BHR) 330, all housed in a radome 340.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station connected to a network (e.g., wireless network 130) to send and/or receive signals from user devices 270. In implementations herein, RF antenna 310 may be enclosed by radome 340, integrated with radome 340, or external to radome 340. While one RF antenna 310 is shown in FIG. 3, outdoor broadband unit 200 may include more than one antenna in other implementations.

LTE module 320 may include hardware or a combination of hardware and software having communication capability via an air interface. For example, LTE module 320 may receive broadband signals and/or voice over Internet protocol (VoIP) signals from wireless network 130 and transmit broadband signals and/or VoIP signals to wireless network 130. LTE module 320 may employ frequency division duplex (FDD) and/or time division duplex (TDD) techniques to facilitate downlink and uplink transmissions.

BHR 330 may include a device for buffering and forwarding data packets toward destinations. For example, BHR 330 may receive data packets from wireless network 130 (e.g., via LTE module 320) and forward the data packets toward user devices 270. In addition, BHR 330 may receive data packets from user devices 270 (e.g., via local router 260) and forward the data packets toward recipient devices (e.g., service provider 140) via network 130. BHR 330 may include a bridge device to receive signals from LTE module 320 via a wired universal serial bus (USB) connection and convert the signals to an Ethernet over coax signal. The Ethernet over coax signal may be assigned a logical channel (e.g., according to SWiM guidelines) and may be combined with coaxial input from satellite antenna 202. In one implementation, the output from BHR 330 may be inserted in a Mid-RF MoCA channel that is separate from the 950 MHz to 2150 MHz range of a typical satellite TV system.

Radome 340 (shown with cut-away view to reveal LTE module 320 and BHR 330) may provide a weatherproof enclosure to protect RF antenna 310, LTE module 320, BHR 330 and/or other components of outdoor broadband unit 200. Generally, radome 340 may include any RF transparent structure that protects components in an outdoor environment.

Combined gateway 115 may be integrated with the SWiM environment associated with satellite antenna 202 to provide both TV service and broadband wireless service. With this architecture, combined gateway 115 may require only one coax line leading from outdoor broadband unit 200/satellite antenna 202. This single coaxial line may feed the in-home coaxial installation to deliver satellite TV service and LTE service to corresponding STBs 230 and user devices 270 (e.g., as shown in FIG. 2). Components of outdoor broadband unit 200, such as RF antenna 310, LTE module 320, and BHR 330, may be powered using coax cable 204.

Although FIG. 3 shows example components of combined gateway 115, in other implementations, combined gateway 115 may contain fewer components, different components, differently arranged components, and/or additional components than depicted in FIG. 3. Alternatively, or additionally, one or more components of combined gateway 115 may perform one or more other tasks described as being performed by one or more other components of combined gateway 115. In one alternative implementation, one or more functions of combined gateway 115 may moved to another location, such as internal to the customer premise. For example, a bridge may be installed in combined gateway 115 instead of BHR 330. The bridge may function to combine coaxial input from satellite antenna 202 with the output from LTE module 320 into a single coax line, which may be forwarded to a broadband router that is installed inside the customer premise.

Figure 4:
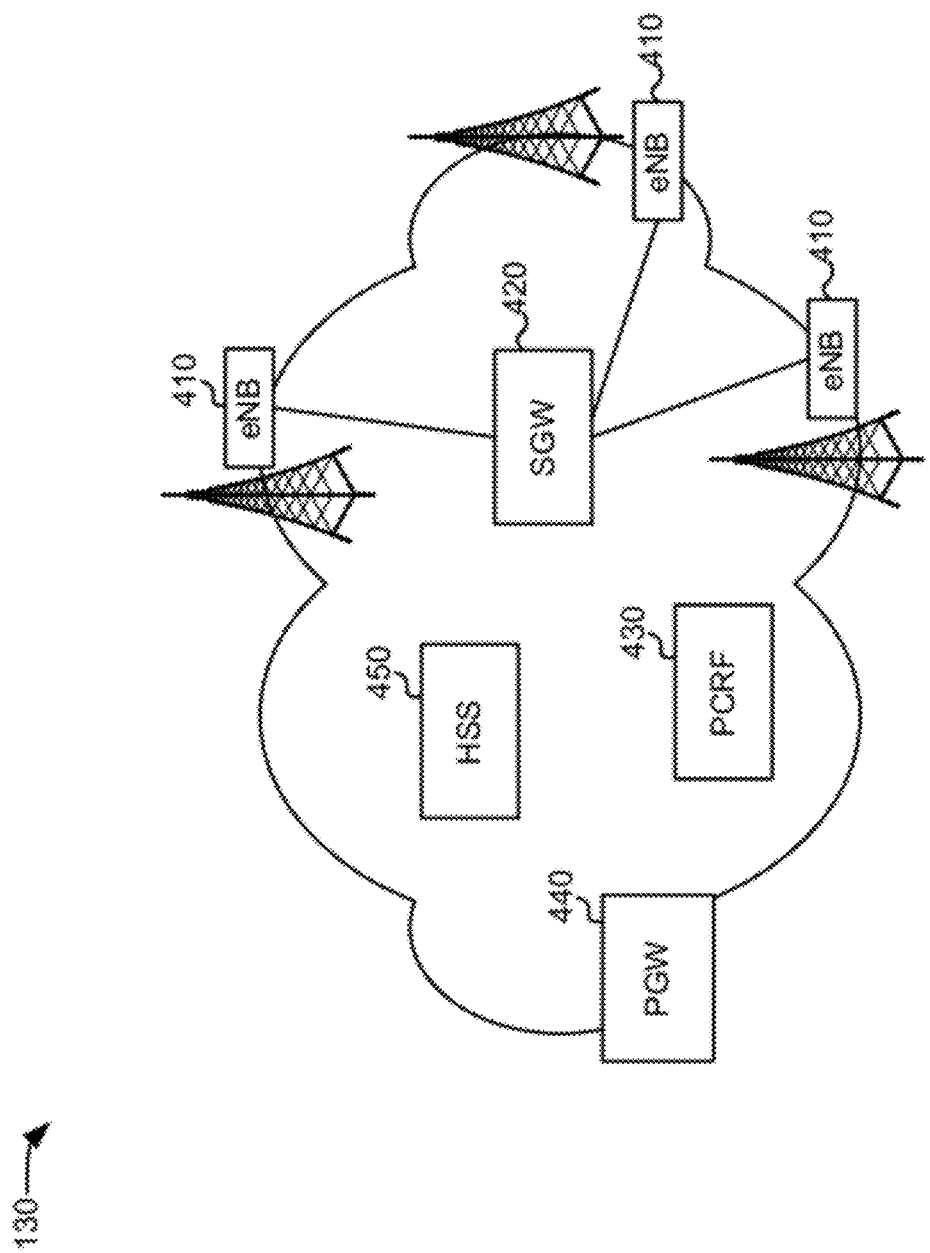
FIG. 4 is a diagram illustrating an example of network devices in a wireless network.

FIG. 4 is a diagram illustrating an example of network devices in wireless network 130. Wireless network 130 may include base stations (eNBs) 410, a serving gateway (SGW) 420, a packet data network gateway (PGW) 430, a policy charging and rules function (PCRF) server 440, and a home subscriber server (HSS) 450. Although three base stations 410, one SGW 420, one PGW, one PCRF server 440, and one HSS 450 are shown in FIG. 4, wireless network 130 may include additional or fewer of these devices. Additionally, wireless network 130 may include additional network components that are not illustrated in FIG. 4.

Base stations 410 may provide the radio interface to transmit and receive data with customer premise networks 110 and mobile devices 120. In one implementation, base stations 410 may utilize LTE standards operating in a 700 MHz frequency band (i.e., base stations 410 may each be a base station in a LTE network). Each base station 410 may be associated with one or more geographical service areas surrounding base station 410. The service areas may be referred to as wireless "cells" or "sectors" that are defined by the radio range of a base station 410.

SGW 420 may be network device that forwards and routes data to and from base stations 410 and PGW 124. SGW 420 may also serve as the local mobility anchor for inter-base station handovers.

PCRF server 430 may access subscriber databases and other resources to make policy decisions relating to subscribers (i.e., customer premise networks 110 or mobile devices 120). The policy decisions may relate to, for example, quality of service (QoS) decisions and charging rules.

PGW 440 may provide connectivity to external networks, such as packet network 140. A user of wireless network 130 may have simultaneous connectivity with more than one PGW to multiple additional networks. PGW 440 may perform, for example, policy enforcement, packet filtering for each user, charging support, lawful interception, and/or packet screening.

HSS 450 may include a database that supports network entities that handle voice over IP (VoIP) calls. HSS 450 may include subscriber profiles, subscriber location information, and subscriber IP information. HSS 450 may also authentication and authorization of subscribers, such as by authenticating a customer premise network 110 by authenticating BHR 330 or LTE module 320 when the when outdoor broadband unit 200 is initially turned on.

Although FIG. 4 shows example components of wireless network 130, in other implementations, wireless network 130 may contain fewer components, different components, differently arranged components, and/or additional components than depicted in FIG. 4. Alternatively, or additionally, one or more components of wireless network 130 may perform one or more other tasks described as being performed by one or more other components of wireless network 130.

Figure 5:
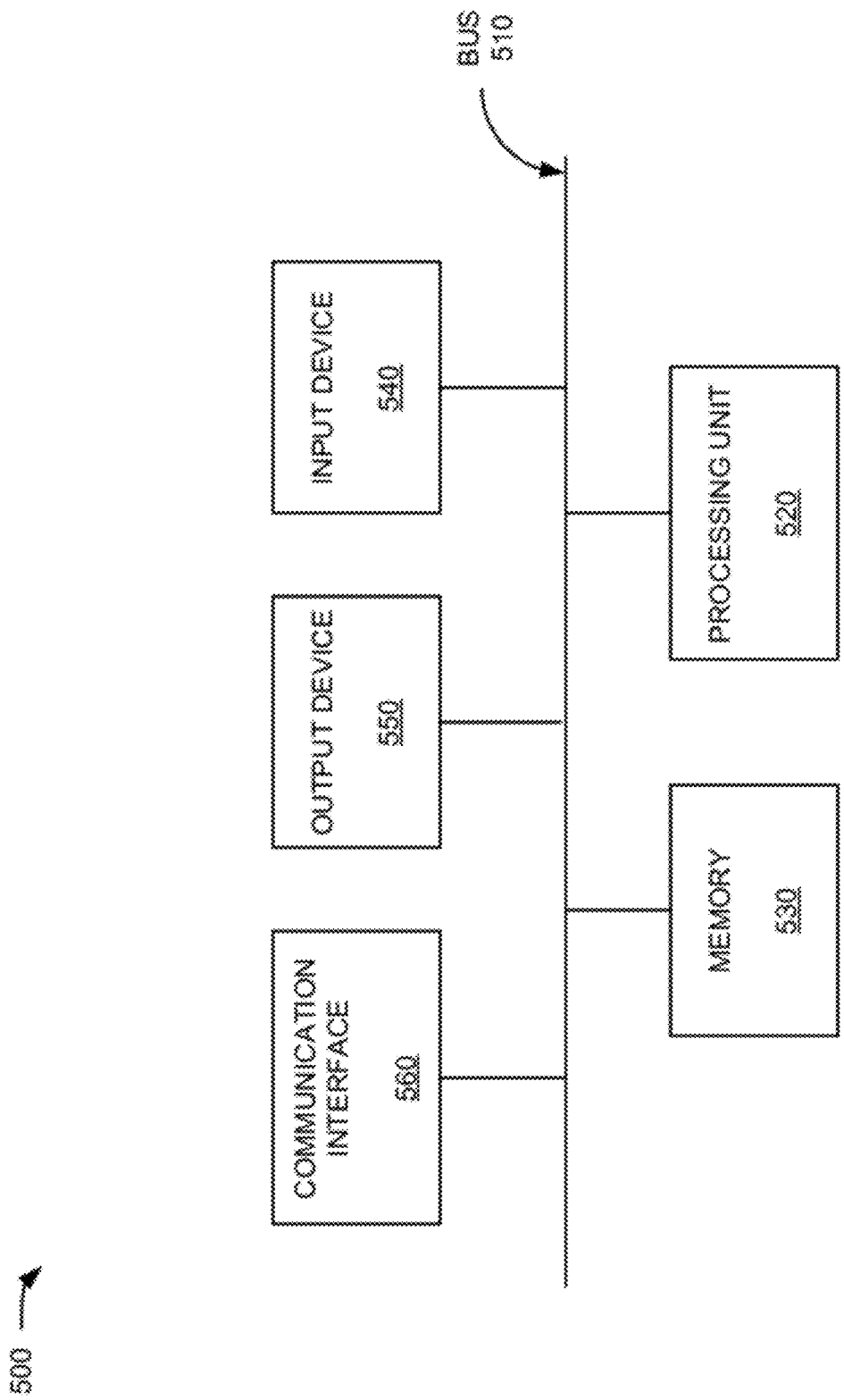
FIG. 5 is a diagram of example components of a device.

FIG. 5 is a diagram of example components of a device 500 that may correspond to one of the devices of environment 100, such as device manager 150, network operations component 160, STB 230, LTE module 320, BHR 330, base stations 410, SGW 420, PCRF server 430, and/or PGW 440.

Bus 510 may permit communication among the components of device 500. Processing unit 520 may include one or more processors or microprocessors that interpret and execute instructions. In other implementations, processing unit 520 may be implemented as or include one or more application specific integrated circuits (ASICs), field programmable gate arrays (FPGAs), or the like.

Memory 530 may include a random access memory (RAM) or another type of dynamic storage device that stores information and instructions for execution by processing unit 520, a read only memory (ROM) or another type of static storage device that stores static information and instructions for the processing unit 520, and/or some other type of magnetic or optical recording medium and its corresponding drive for storing information and/or instructions.

Input device 540 may include a device that permits an operator to input information to device 500, such as a keyboard, a keypad, a mouse, a pen, a microphone, one or more biometric mechanisms, and the like. Output device 550 may include a device that outputs information to the operator, such as a display, a speaker, etc.

Communication interface 560 may include any transceiver-like mechanism that enables device 500 to communicate with other devices and/or systems. For example, communication interface 560 may include mechanisms for communicating with other devices, such as other devices of environment 100, customer premises network 110, wireless network 130, and/or network 140.

As described herein, device 500 may perform certain operations in response to processing unit 520 executing software instructions contained in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows example components of device 500, in other implementations, device 500 may contain fewer components, different components, differently arranged components, or additional components than depicted in FIG. 5. Alternatively, or additionally, one or more components of device 500 may perform one or more other tasks described as being performed by one or more other components of device 500.

Figure 6:
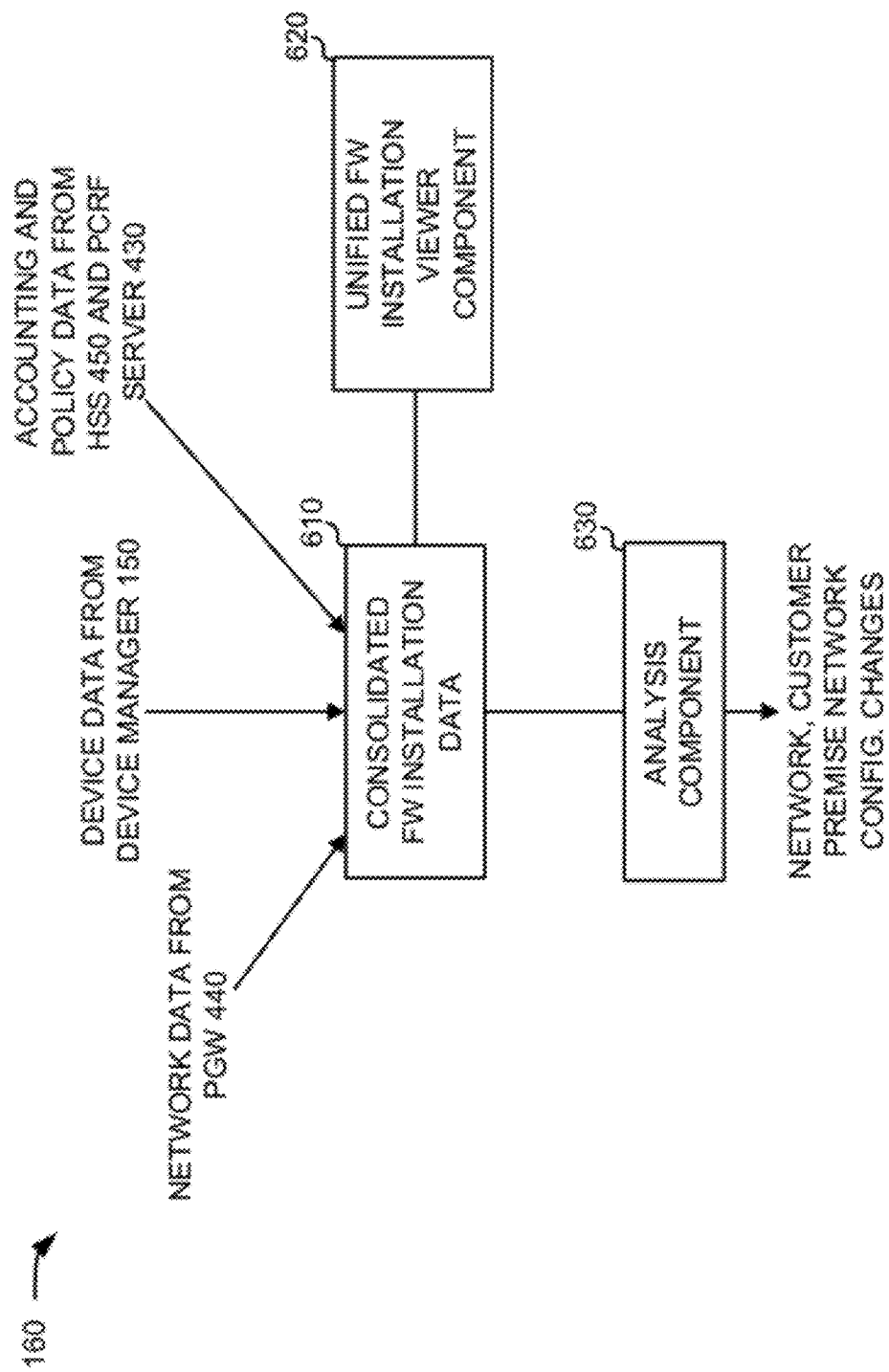
FIG. 6 is a conceptual diagram illustrating example functional components of a network operations component shown in FIG. 1.

FIG. 6 is a conceptual diagram illustrating example functional components of network operations component 160. In one implementation, network operations component 160 may be implemented by a cluster of computing devices, such as devices 500. Network operations component 160 may be, for example, a data center staffed by a number of administrators that may act to monitor, provision, and optimize the fixed wireless installations of customer premise networks 110. Network operations component 160 may include consolidated fixed wireless (FW) installation data 610, a unified FW installation viewer component 620, and an analysis component 630.

Consolidated FW installation data 610 may include information, relating to customer premise networks 110, received from a number of sources in environment 100. Consolidated fixed FW installation data 610 may generally be used to monitor and manage the operation of customer premise networks 110. As shown in FIG. 6, examples of the sources that may be used to form consolidated FW installation data 610 include: network data from PGW 440, device data from device manager 150, and accounting and policy data from HSS 450 and/or PCRF server 430.

Consolidated FW installation data 610 may include network data from PGW 440. The network data may include information relating to the communications of a particular customer premise network 110 with a packet network, such as network 140. The network data may include, for instance: information relating to the bandwidth used by a customer premise network 110, information describing the quality of service of the data traffic provided to the customer premise network 110, protocols or applications used by the customer premise network 110, information relating to the operation of base stations 410 with respect to the customer premise network 110, or other information describing the interaction of a customer premise network 110 with one or more components of wireless network 130 and/or network 140. In some implementations, the network data may be received from sources other than PGW 440, such as from SGW 420 or base stations 410.

Consolidated FW installation data 610 may additionally include device data from device manager 150. As previously mentioned, device manager 150 may receive information relating to the operational state of devices within customer premise network 110. Device manager 150 may transmit this information to network operations component 160. The device data may include, for instance, configuration information relating to the communication settings for the radio interface to wireless network 130, information relating to the stability of customer premise network 110, information describing error states that occurred in one or more of the devices at of customer premise network 110, etc.

Consolidated FW installation data 610 may additionally include accounting and policy data from PCRF server 430 and HSS 450. Network operations component 160 may query HSS 450 and/or PCRF server 430 to obtain information from these network components. For example, policy rules that are currently set for the customer premise networks 110 may be obtained from PCRF server 430. Subscriber profiles, subscriber location information, subscriber IP information, and/or other information relating to the subscriber associated with a customer premise network 110 may be obtained from HSS 450.

The information, and the sources used to obtain the information, that is part of consolidated FW installation data 610, as described above, includes examples of possible information relating to customer premise networks 110. In other implementations, other sources or types of information may instead or additionally be included as part of consolidated FW installation data 610.

Unified FW installation viewer component 620 may include logic to present consolidated FW installation data 610 to administrators. Unified FW installation viewer component 620 may, for example, present a graphical, textual, or other interface that allows administrators to view and analyze the operation of customer premise networks 110. For example, unified FW installation viewer component 620 may graphically present an indication of whether LTE module 320 of a number of customer premise networks 110 and are connected to wireless network 130 and may display the current data usage of each of the customer premise networks. In some implementations, administrators may be able to customize the output of unified FW installation viewer component 620 to provide a customized view of the states of customer premise networks 110.

Analysis component 630 may include logic that provides for the automatic, manual, or semi-automatic (i.e., in conjunction with an administrator) analysis of consolidated FW installation data 610. Based on the analysis, analysis component 630 may make changes to environment 100. Analysis component 630 may, for example, change configuration information for one or more devices in a customer premise network 110 and/or change the configuration of a network device in wireless network 130. The operation of analysis component 630 will be described in more detail below.

Although FIG. 6 shows example functional components of network operations component 160, in other implementations, network operations component 160 may contain fewer components, different components, differently arranged components, or additional components than depicted in FIG. 6. Alternatively, or additionally, one or more components of network operations component 160 may perform one or more other tasks described as being performed by one or more other components of network operations component 160.

Figure 7:
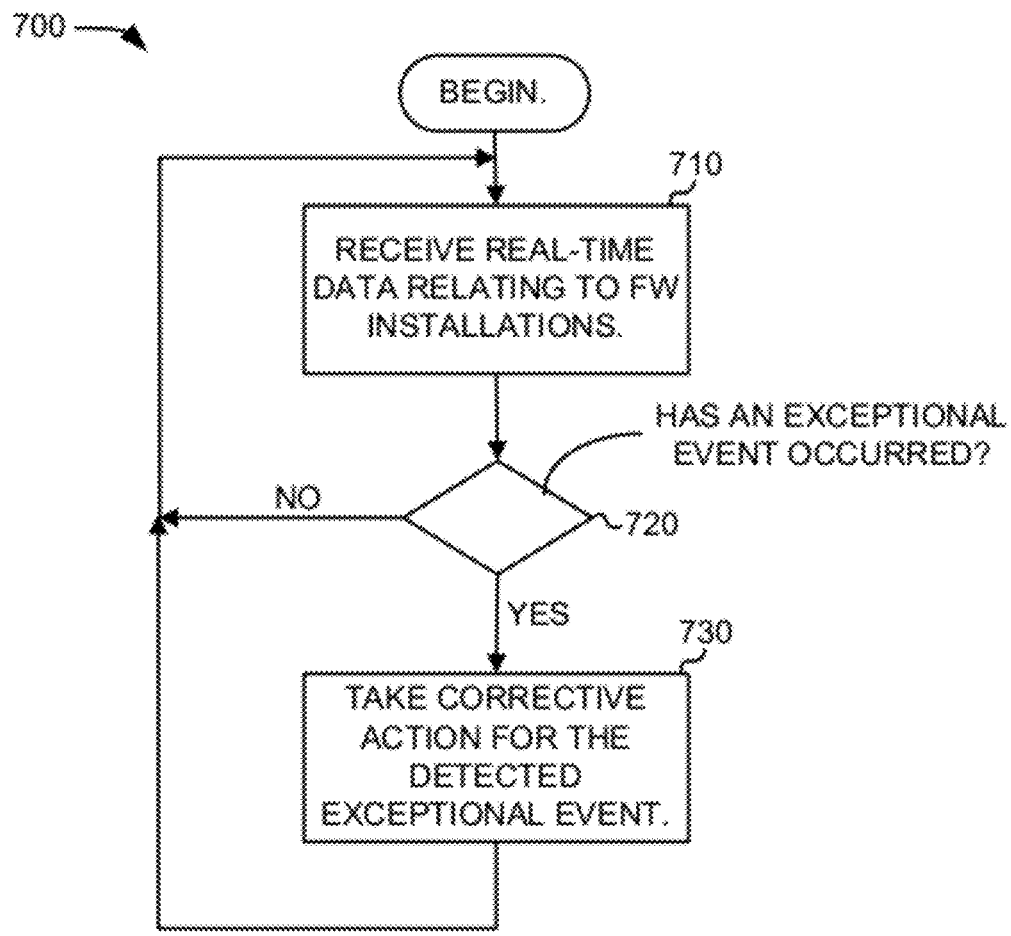
FIG. 7 is a flow chart illustrating an example process for detecting and acting on exceptional events.

FIG. 7 is a flow chart illustrating an example process 700 for detecting and acting on exceptional events. In one implementation, process 700 may be performed by network operations component 160.

Process 700 may include receiving real-time data relating to the fixed wireless installations (e.g., customer premise networks 110) (block 710). The real-time data may be data that is received as consolidated FW installation data 610, as discussed with respect to FIG. 6. Although described as "real-time," in general, the real-time data may include any data relating to a negative change in operation of network 130 and/or customer premise network 110, which may be responded-to in time to correct the negative change. The real-time data may include data relating to exceptional events at any of customer premise networks 110, such as power outages, network connectivity trouble, exceptional events relating to security violations, etc. As another example of the real-time data, the real-time data may include data relating to network events, such as exceptionally high data usage, or data that may indicate a network attack.

Process 700 may further include determining whether an exceptional event has occurred (block 710). In one implementation, analysis component 630 may continuously monitor consolidated FW installation data 610 and determine whether the data indicates that an exceptional event may be occurring. For example, analysis component 630 may determine whether an exceptional event is occurring at a customer premise network 110. Examples of such exceptional events may include: unusually low bandwidth available to a customer premise network 110, a power outage or other offline condition at a customer premise network 110, a failing device at a customer premise network 110, a poor radio connection by LTE module 320, etc. The exceptional events may additionally or alternatively be exceptional events occurring in network 130, such as a base station 410 nearing capacity; exceptionally high data usage, for a customer premise network 110, detected at PGW 440; or security threats detected in network 130.

When an exceptional event is determined to be occurring, (block 720—YES), process 700 may further include taking corrective action relating to the exceptional event (block 730). The corrective action may include sending one or more messages, or otherwise taking actions by network operations component 160, to network 130 and/or a customer premise network 110. The messages may include configuration updates, topology changes, or other changes to network 130 and/or a customer premise network 110 that are designed to correct or mitigate the exceptional event.

A number of different messages may be sent or actions taken to correct or mitigate the exceptional event. The particular message/action that is generated/performed by network operations component 160 may be based on the detected exceptional event. In one implementation, the message/action may be determined based on heuristic techniques in which each potential exceptional event is associated with one or more rules that define how to handle the exceptional event.

As an example of responding to an exceptional event, assume that the detected exceptional event is that the air interface for a particular base station 410 is becoming overloaded and that one or more customer premise networks 110 are attached to that particular base station. Network operations component 160 may, in response, send a message to the one or ore customer premise networks 110 to cause the customer premise networks to disconnect from the particular base station 410 and attach to another base station 410 within range of customer premise networks 110.

As another example of responding to an exceptional event, assume that the exceptional event is that of a poor radio connection by LTE module 320 of a customer premise network 110. Network operations component 160 may, in response, determine one or more configuration changes for LTE module 320 or base station 410 to potentially obtain a better radio connection to wireless network 130. For example, network operations component 160 may determine to adjust RF antenna 310 and may communicate the adjustment to device manager 150. Device manager 150 may then cause LTE module 320 to correspondingly adjust RF antenna 310.

As another example of responding to an exceptional event, assume that the exceptional event is that of exceptionally high data usage or data usage that is approaching a contractual cap. This exceptional event may be detected by, for example, PGW 440. Network operations component 160 may, in response, instruct PGW 440 to throttle the data usage of the customer premise network 110 to a certain bandwidth (e.g., 10 Mbps) or block the customer premise network 110.

Figure 8:
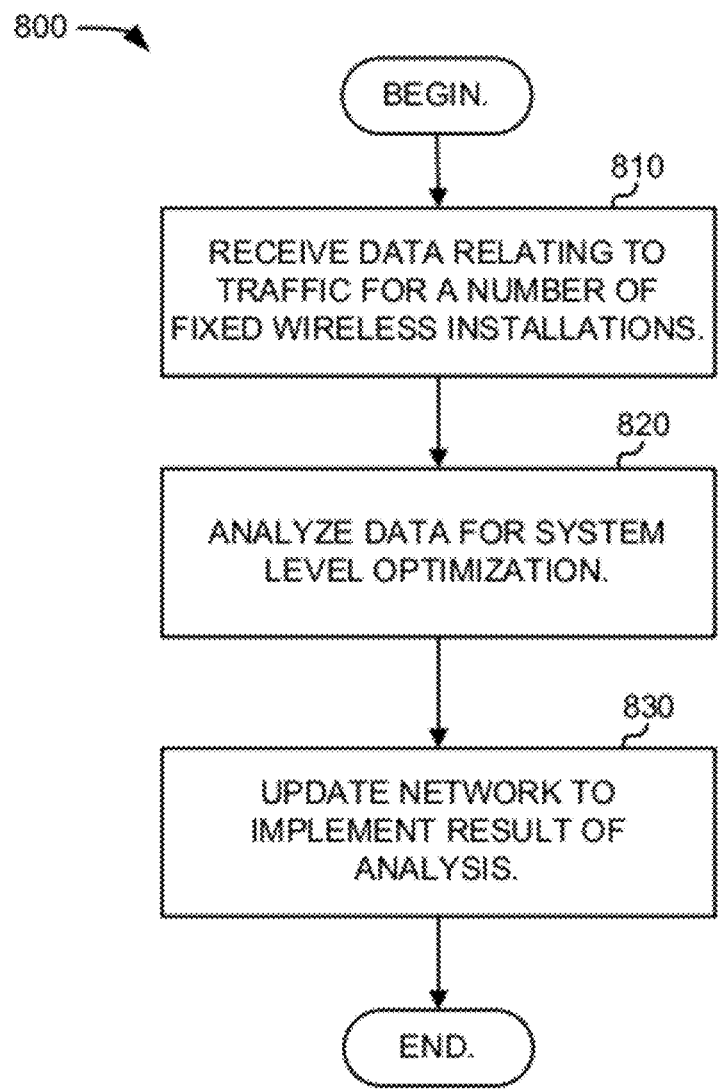
FIG. 8 is a flow chart illustrating an example process for optimizing network operation.

FIG. 8 is a flow chart illustrating an example process 800 for optimizing network operation. Process 800 may be performed by network operations component 160.

Process 800 may include receiving data relating to traffic for a number of fixed wireless installations (e.g., customer premise networks 110) (block 810). The data may be data that is received as consolidated FW installation data 610, as discussed with respect to FIG. 6. The data may generally relate to traffic patterns, traffic load patterns, and/or application usage patterns for users of customer premise networks 110. This data may be data obtained from PGW 440 or device manager 150.

Process 800 may further include analyzing the data for system level optimization (block 820). In one implementation, analysis component 630, either automatically or with the assistance of an operator, may determine optimizations that may be made to the operation of customer premise networks 110 and/or network 130. For example, heavily downloaded content items may be identified so that the content items can be cached at customer premise networks 110 or moved to higher capacity servers in network 130 or network 140. As another example, network applications that are used by a significant number of users of customer premise networks 110 may be identified so that parameters associated with devices in network 130 may be optimized for these applications. As another example, the data may be used to identify system level blockages in network 130 or elsewhere. As another example, trends in traffic may be analyzed to identify future network evolution or optimizations (e.g., if traffic through a network device continues to increase over a period of months, it may be determined when the network device will need to be replaced with a higher capacity network device). As another example, the interaction of traffic of mobile devices 120 and customer premise networks 110 may be analyzed to determine whether the operation of customer premise networks 110 is adversely affecting the quality of service of mobile devices 120.

Process 800 may further include updating or changing network 130 to implement results of the analysis performed in block 820 (block 830). The updates/changes may generally include sending one or more messages or otherwise taking actions, by network operations component 160, to network 130. The messages may include configuration updates, topology changes, or other changes to network 130 and/or a customer premise network 130 that are designed to implement the optimizations determined in block 820.

As an example, assume that a number of video applications are identified as the applications that are responsible for the majority of the traffic to customer premise networks 110. In this case, network operations component 160 may optimize the connection, in network 130, of the servers associated with the applications to base stations 410.

As another example of blocks 820 and 830, an analysis of consolidated FW installation data 610 may indicate that, at certain times during the day, traffic from customer premise networks 110 tend to restrict the operation of mobile devices 120. In response, network operations component 160 may set policies in PCRF server 430 to limit the bandwidth of customer premise networks 110 during these times.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device implemented method comprising:
   receiving, by the device, data relating to operation of fixed wireless installations, the data being received from a plurality of sources, including the fixed wireless installations and network devices used to implement a long term evolution (LTE) cellular network to which the fixed wireless installations connect;
   storing, by the device, the data;
   analyzing, by the device, the data to determine optimizations to improve the operation of one or more of the fixed wireless installations or the LTE cellular network, the analyzing including determining, based on real-time data received by the device, whether an event has occurred with respect to the fixed wireless installations, the event including one or more of unusually low bandwidth available to one of the fixed wireless installations,
a power outage at one of the fixed wireless installations,
a failing device at one of the fixed wireless installations,
poor radio connectivity to one of the fixed wireless installations,
a base station, in the LTE network, nearing capacity of a radio interface, or
exceptionally high data usage by one of the fixed wireless installations; and changing, by the device and based on the analysis, a configuration of at least one of the fixed wireless installations and at least one of the network devices.

2. The method of claim 1, where the data relating to the operation of the fixed wireless installations includes data, from gateways in the LTE cellular network, relating to network traffic from the fixed wireless installations.

3. The method of claim 1, where the data relating to the operation of the fixed wireless installations includes data, from a home subscriber service or a policy charging and rules function server in the LTE cellular network, relating to accounting and policy information of the fixed wireless installations.

4. The method of claim 1, where the data relating to the operation of the fixed wireless installations includes data from devices within the fixed wireless installations.

5. The method of claim 1, further comprising:
providing a graphical interface to present a unified view of the data to administrators.

6. The method of claim 1, where receiving the data further includes:
receiving the data through an Internet Protocol (IP) network.

7. The method of claim 1, where the fixed wireless installations each include customer premise locations that connect to the LTE cellular network and to a satellite network.

8. A system comprising:
a device manager to communicate with devices in a plurality of fixed wireless installations that each receive a broadband connection through a long term evolution (LTE) cellular network; and
a network operations component to:
store consolidated data relating to the fixed wireless installations and data relating to operation of the LTE cellular network with respect to the fixed wireless installations, the data relating to the fixed wireless installations including data, from gateways in the LTE cellular network, relating to network traffic from the fixed wireless installations,
reconfigure the LTE cellular network and at least one of the fixed wireless installations to optimize, based on the consolidated data, the broadband connection of the at least one of the fixed wireless installations with respect to the LTE cellular network, and
determine, based on real-time data received as part of the consolidated data, whether an exceptional event has occurred with respect to the fixed wireless installations, the exceptional event including one or more of:
unusually low bandwidth available to one of the fixed wireless installations,
a power outage at one of the fixed wireless installations,
a failing device at one of the fixed wireless installations,
poor radio connectivity to one of the fixed wireless installations,
a base station, in the LTE network, nearing capacity of a radio interface, or
exceptionally high data usage by one of the fixed wireless installations.

9. The system of claim 8, where the consolidated data includes data, from a home subscriber service or a policy charging and rules function server in the LTE cellular network, relating to accounting and policy information of the plurality of fixed wireless installations.

10. The system of claim 8, where the consolidated data includes data from devices within the fixed wireless installations.

11. The system of claim 8, where the network operations component further includes:
a viewer component to provide a graphical interface to present a unified view of the consolidated data to administrators.

12. The system of claim 8, where the network operations component is connected to the device manager and the LTE cellular network through an Internet Protocol (IP) network.

13. A computer-readable medium containing programming instructions executable by one or more processing units, the computer-readable medium containing instructions to:
receive data relating to operation of fixed wireless installations, the data being received from a plurality of sources, including the fixed wireless installations and network devices used to implement a long term evolution (LTE) cellular network to which the fixed wireless installations connect;
analyze the data to determine optimizations to improve the operation of one or more of the fixed wireless installations or the LTE cellular network, the analysis including determining, based on received real-time data, whether an exceptional event has occurred with respect to the fixed wireless installations; and
change, in response to the analysis, a configuration of at least one of the fixed wireless installations and at least one of the network devices, wherein the determined exceptional event includes one or more of:
unusually low bandwidth available to one of the fixed wireless installations,
a power outage at one of the fixed wireless installations,
a failing device at one of the fixed wireless installations,
poor radio connectivity to one of the fixed wireless installations,
a base station, in the LTE network, nearing capacity of a radio interface, or
exceptionally high data usage by one of the fixed wireless installations.

14. The computer-readable medium of claim 13, where the data relating to the operation of the fixed wireless installations includes data, from gateways in the LTE cellular network, relating to network traffic from the fixed wireless installations.

15. The computer-readable medium of claim 13, where the data relating to the operation of the fixed wireless installations includes data, from a home subscriber service or a policy charging and rules function server in the LTE cellular network, relating to accounting and policy information of the fixed wireless installations.

16. The computer-readable medium of claim 13, where the data relating to the operation of the fixed wireless installations includes data from devices within the fixed wireless installations.

17. The computer-readable medium of claim 13, where the fixed wireless installations each include customer premise locations that connect to the LTE cellular network and to a satellite network.

* * * * *